Patented May 23, 1933

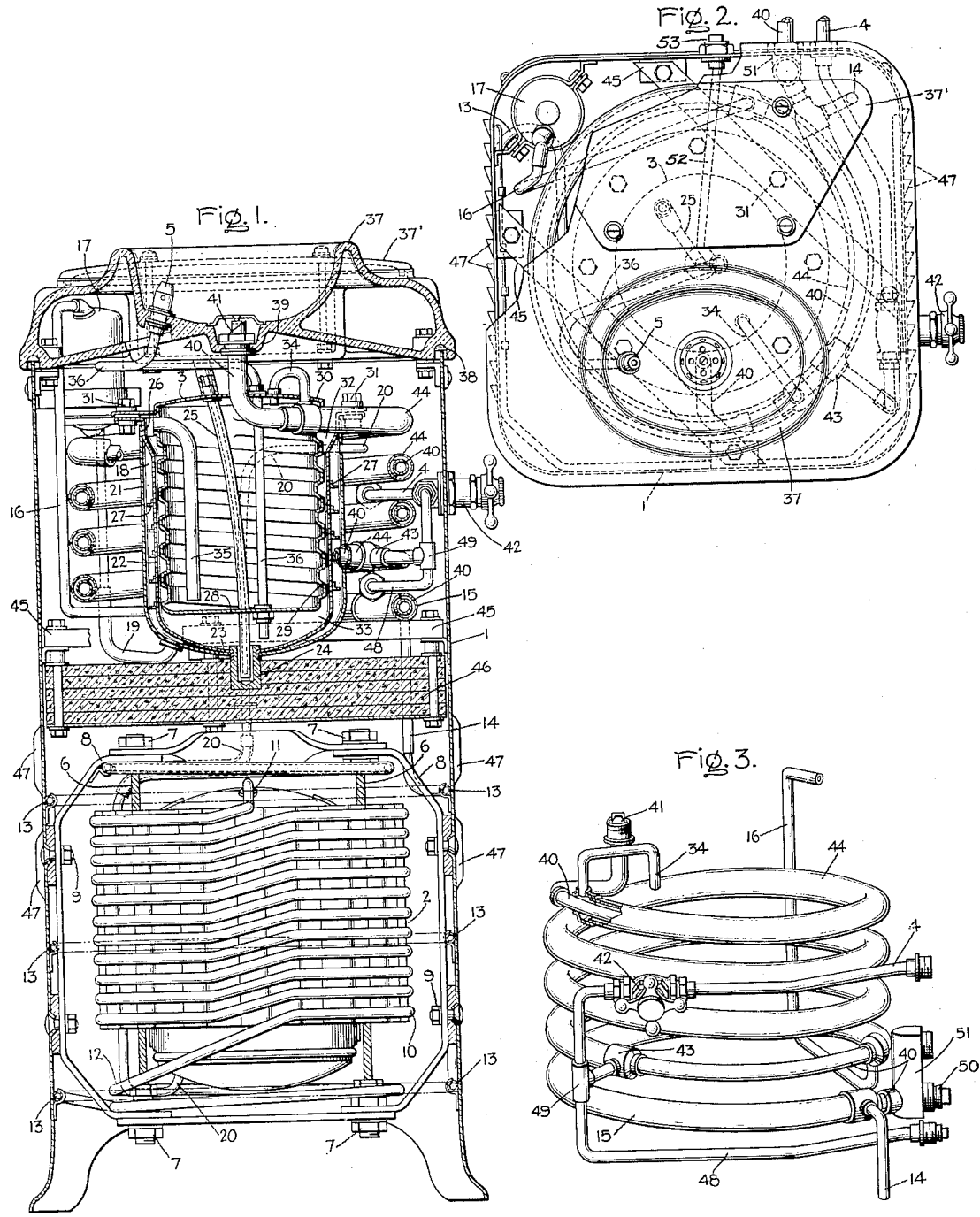

1,911,042

UNITED STATES PATENT OFFICE

CHRISTIAN STEENSTRUP, OF SCHENECTADY, NEW YORK, ASSIGNOR TO GENERAL ELECTRIC COMPANY, A CORPORATION OF NEW YORK

REFRIGERATING APPARATUS

Application filed March 11, 1932. Serial No. 598,198.

My invention relates to refrigerating apparatus, and more particularly to water coolers of the pressure, or bubbler type.

A principal object of my invention is the provision of an improved water cooler of the aforesaid type, which shall be efficient in operation, comparatively simple and compact in structure and economical in construction.

My invention will be more fully set forth in the following description referring to the accompanying drawing, and the features of novelty which characterize my invention will be pointed out with particularity in the claims annexed to and forming a part of this specification.

Referring to the drawing, Fig. 1 is an elevational view, partly in section, of a pressure water cooler embodying my invention; Fig. 2 is a plan top view, partly in section, of the apparatus shown in Fig. 1, and Fig. 3 is a detailed isolated view of the coil structure shown in Fig. 1.

Referring to Fig. 1, the water cooler illustrated comprises a supporting housing 1, which may be a box-like sheet metal structure, within which are mounted the elements of the water cooling apparatus. The essential parts of the refrigerating system comprise a compressor and condenser unit 2 mounted in a manner hereinafter described in the lower part of the housing 1, a water cooling unit 3 through which a refrigerant from the compressor unit and the water to be cooled are circulated in heat transfer relation, a water supply line 4 which may be connected to any suitable source, as a city water main, for supplying the water to be cooled, and a drinking fountain nozzle 5, or other suitable supply outlet. The water supply line is provided with a spring closed valve 42, and a restricted orifice to limit the pressure to which the water cooling unit is subjected.

The compressor and condenser unit 2 is similar to the construction disclosed in my Patent No. 1,736,635, granted November 19, 1929, and assigned to the same assignee as this invention, although any suitable type known in the art may be used. For the purpose of eliminating, or reducing, vibration due to starting and stopping of the motor wthin the compressor unit, the unit is suspended by flexible cables 6, which are secured at their opposite ends to the housing 1. In the construction shown the cables are secured at their ends at 7, to the brackets 8 which are bolted at 9, to the side walls of the housing 1.

The compressor and condenser unit 2 has mounted thereon a condenser coil 10, the intake end of the coil being connected to the unit at 11, and the lower part of the coil 12 continuing at 13, so as to extend along and adjacent the inner wall of the housing 1 for the purpose of effectively utilizing the wall of the housing as a heat dissipating surface. This construction is described and claimed in by application, Serial No. 554,623, filed August 3, 1931, and assigned to the same assignee as my present invention. The coils 13 of the condenser extend upwardly, at 14, to an enlarged auxiliary condenser coil 15, which is in heat transfer relation to the cooled waste water from the bubbler nozzle. The condenser coil 15 is connected by a pipe 16 to a float valve 17 for controlling the flow of liquid refrigerant from the condenser to an evaporator chamber 18 formed within the water cooling unit 3. The evaporator chamber is connected to the float valve by a pipe 19, and is connected to a suction pipe 20 connecting the evaporator chamber to the intake of the compressor arranged within the casing enclosing the compressor unit.

The evaporator chamber 18 in the water cooling unit 3 is of the flooded type, and during the operation of the refrigeration system the level of liquid refrigerant is maintained below the end of the pipe 20 in the evaporator chamber. The evaporation of liquid refrigerant absorbs heat and cools the water in the water cooling unit. The cooling unit includes a pair of concentrically disposed cuplike shells 21 and 22 spaced apart to form the annular evaporator chamber 18. The shells are secured together at their lower ends 23, and are provided with alined apertures within which is mounted a hollow member 24 for receiving the lower end of a thermostatic element 25, which extends within the cooling unit and is connected in any suitable manner (not shown) to control, or indicating apparatus. The upper edges of the shells 21 and 22 are secured together at 26, as by welding, and a helical strip 27 is tack welded to the shell 22 so as to form a helical passage for the refrigerant in flowing through the evaporator chamber.

Water is supplied to the cooling unit through a connection 34, and cold water is withdrawn therefrom through a pipe 36. In order to direct the water passing through the cooling unit in efficient heat transfer relation to the refrigerant in the evaporator chamber, the cooling unit is provided with a cylindrical shell 28 closed at its lower end and disposed within and closely fitting the inner wall of the shell 22. The shell 28 is preferably of metal, as stainless steel for example, which is not subject to corrosion and which may be tightly fitted within shell 22. The side walls of the shell 28 are provided with a helical corrugation 29 forming with the inner walls of the shell 22 a fluid passage for the flow of water over the surface of the evaporator chamber. The shell 28 is removably fitted in a recess in a cover member 30, which is suitably clamped, as at 31, to a flange formed by the upper edge of the shell 22, said shell forming within the cooling unit an upper annular chamber 32 and a lower chamber 33, which are interconnected by the helical passage above described.

The water supplied through the connection 34 to the chamber inside of the shell 28 is cooled to some extent therein, but is finally reduced to the desired temperature in passing through the pipe 35 from the lower portion of the chamber 28 to the chamber 32 about the upper end of the shell 28, over the wall of the evaporator through the helical passage formed by the corrugations in the side wall of the shell 28 to the chamber 33 and through the outlet pipe 36 to the nozzle 5.

When it is desired to clean the water cooling unit this can be conveniently accomplished by removing the cover member 30 and the shell 28 which provides ready access to all of the inner surfaces of the water cooling unit.

The upper part of the housing 1 is provided with a bubbler basin 37 composed of a suitable vitreous material and shaped in any desired manner. The basin 37 in provided with a groove at its lower edge at 38 which fits on the housing 1 and is provided with a depression 39 at the bottom for collecting the waste water from the bubbler nozzle. A detachable cover 37' (Figs. 1 and 2) is mounted over an opening in the basin structure permitting inspection of the control device of the refrigerating apparatus, which is arranged beneath this cover.

At the bottom of the basin the waste pipe 40 or other suitable conduit extends into the depression 39, its open end being tapered or cut at an angle, as at 41, for the purpose of increasing the rate of flow through the waste pipe without objectionable water hammer or gurgling. By tapering the waste pipe as shown, the possibility of the same being entirely covered by water is reduced, thereby permitting a smaller waste pipe for a given rate of flow.

The efficiency of the refrigerating apparatus is increased and a compact design is obtained by directing the water supplied to the water cooling unit by the pipe 4 through a jacket or other suitable conduit on or in heat exchange relation with the waste pipe 40, so that the water supply is pre-cooled and reduced somewhat in temperature before it enters the cooling unit by the cold waste water. I accomplish this by connecting the supply pipe 4 to a jacket pipe 44 on the helical waste pipe 40, which jacket pipe is arranged about the cooling unit and connects at its upper end to the water cooling unit by the pipe 34. In this way, the water supplied and the waste water are in counterflow and heat exchange relation to the point where the feed water is directly admitted at 34 to the cooling unit. This arrangement in pre-cooling the water by the relatively cold waste water results in a compact design and in an efficient heat transfer system.

The waste water flowing through the helical pipe 40 is further utilized to cool and condense refrigerant by arranging a jacket 15 or conduit on or in heat exchange relation with the lower coil of the waste pipe 40, which serves as an auxiliary condenser, as shown in Figs. 1 and 3.

It will thus be seen that the continuous helical, waste water coil 40 arranged about the water cooling unit 3 is a compact construction providing for efficient heat transfer between the waste water and both the water supplied to the water cooling unit and the auxiliary condenser.

The structure forming the helically arranged coils above described and the cooling unit surrounded thereby is suitably supported in the upper part of the housing 1, by bars 45 composed of wood, or other thermally resistant material, so as to prevent loss in efficiency of the refrigerating system due to conduction of heat from the casing to these parts. A thick insulating wall 46 of built-up layers of suitable insulation separates the lower compressor and condenser unit from the cooling unit and associated apparatus, the lower part of the housing being suitably ventilated as by louvers 47 formed in the side walls thereof.

The operation of the water cooler is believed to be apparent from the above description. When it is desired to use the apparatus the valve 42 is rotated to open the same, thereby placing the water within the cooling unit under sufficient pressure to cause flow of cold water therefrom to the bubbler nozzle 5. The waste water flows by gravity through the waste pipe 40, pre-cooling the feed water and cooling the auxiliary condenser coil, after which it flows to the drain.

When the water cooler is not in use it may be necessary to drain water entirely from the apparatus. For this purpose there is shown in Figs. 1 and 3 a drain pipe 48 connected to the water supply pipe at 49 for draining the water from coil 44, and a drain plug 50 at the lower end of the trap 51 for draining the waste water from the jacketed coil 40. The cooling unit 3 is drained at its bottom by a pipe 52 (Fig. 2) connected to the recess in member 24 and terminating in an outlet connection 53 having a plug arranged exteriorly of the housing 1.

It should be understood that my invention is not limited to specific details of construction and arrangement thereof herein illustrated, and that I intend to cover in the appended claims all modifications thereof, which do not depart from the spirit and scope of my invention.

What I claim as new and desire to secure by Letters Patent of the United States is:

1. Refrigerating apparatus for cooling water including a cooling unit, a helically coiled pipe arranged about and encircling said cooling unit for supplying water thereto, means for directing cooled water from said unit for use, and a pipe for carrying away the cooled waste water, one of said pipes being jacketed by the other so that water supplied to said unit is pre-cooled by said waste water.

2. Refrigerating apparatus for cooling water including a cooling unit, a helically coiled pipe arranged about and encircling said cooling unit for supplying water thereto, means for directing cooled water from said unit for use, and a pipe disposed within and jacketed by said supply pipe for carrying away the cooled waste water, said pipe being arranged so that the water supplied to said unit is precooled by a counter-flow of the waste water.

3. Refrigerating apparatus for cooling water including a refrigerating system having a refrigerant condensing coil, a cooling unit operatively connected to said refrigerating system, a pipe for supplying water to said cooling unit, and a pipe for carrying away cooled waste water, said waste pipe being in the form of a helix about said cooling unit and being jacketed both by said pipe for carrying away waste water and said condensing coil.

4. Refrigerating apparatus for cooling water including shell structure forming a cooling unit, a helically coiled pipe supplying water to said cooling unit surrounding and compactly arranged with respect to said unit, and a pipe for carrying away cooled waste water jacketed by said supply pipe for pre-cooling the water supply.

5. Refrigerating apparatus for cooling water including a refrigerating system having a refrigerant condensing coil, a cooling unit operatively connected to said refrigerating system, a coiled pipe supplying water to said cooling unit, and a pipe for carrying away cooled waste water, said waste water pipe being arranged in a continuous coil so as to be jacketed by both said supply pipe and said condenser coil.

6. Refrigerating apparatus for cooling water including a refrigerating system having a refrigerant condensing coil, a shell-type cooling unit operatively connected to said refrigerating system, a helically coiled pipe supplying water to said cooling unit, and a pipe for carrying away cooled waste water arranged within and jacketed by said supply pipe and condensing coil, said jacketed waste water pipe forming a helix within which said cooling unit is centrally disposed.

7. Refrigerating apparatus for cooling water including a refrigerating system having a refrigerant condensing coil, shell structure forming a cooling unit operatively connected to said refrigerating system, a pipe supplying water to said cooling unit, a helically coiled pipe for carrying away cooled waste water jacketed in part by said supply pipe, the lower coil of said waste pipe being jacketed by said condensing coil, said shell structure mounted within and substantially surrounded by the helix defined by said coils.

8. In refrigerating apparatus for cooling water, a cooling unit having a water chamber, means for cooling said unit, a removable cover for said cooling unit, a cylindrical shell fitted in said cover, said cylindrical shell being disposed within said water chamber and closely fitting the inner wall of said cooling unit, the coacting side walls of said cooling unit and said cylindrical shell arranged to form a helical passage interconnecting upper and lower portions of said cooling unit, and means supplying water to said cooling unit so as to circulate through said helical passage in heat transfer relation to the refrigerant in said chamber.

9. In refrigerating apparatus for cooling water, a cooling unit comprising an evaporator chamber formed by concentric shells, a cylindrical shell closed at opposite ends disposed within and closely fitted to the inner wall of said evaporator chamber, the side walls of said cylindrical shell having a helical corrugation to form with said inner wall a passage interconnecting upper and lower water chambers within said unit, and fluid passage means connecting the interior of said cylindrical shell with said upper chamber so that water may circulate from said cylindrical shell through said helical passage to said lower chamber from which it is drawn for use.

10. In refrigerating apparatus for cooling water, a cooling unit comprising an evaporator chamber formed by concentric shells, a cylindrical shell closed at its opposite ends defining upper and lower chambers within said unit, the side walls of said cylindrical shell having a helical corrugation forming with said evaporator chamber a helical passage interconnecting said upper and lower chambers, means for supplying water to said cylindrical shell at its upper part, a pipe forming a fluid passage between the lower part of said cylindrical shell and said upper chamber, and a pipe for drawing cooled water from said lower chamber for use.

11. In refrigerating apparatus for cooling water, a cooling unit comprising an evaporator chamber formed by two cup-like concentrically disposed shells secured together at their lower ends, the upper edge of the inner shell being secured to and overhanging the corresponding edge of the outer shell to form a flange, a cover member secured to said flange, and a cylindrical shell depending from said cover member and closely fitted to the walls of said inner shell, the side walls of said cylindrical shell having a helical corrugation to form with said inner shell a cooling passage in good heat transfer relation with said evaporator chamber.

12. Refrigerating apparatus for cooling water including a cooling unit, a conduit arranged about and encircling said cooling unit for supplying water thereto, means for directing cooled water from said unit for use, and a conduit for carrying away cooled waste water, said conduits being in heat exchange relation with each other so that water supplied to said unit is precooled by said waste water.

13. Refrigerating apparatus for cooling water including a cooling unit, a helically coiled conduit arranged about and encircling said cooling unit for supplying water thereto, means for directing cooled water from said unit for use and a conduit for carrying away cooled waste water, one of said conduits being in heat exchange relation substantially throughout its length with the other of said conduits so that water supplied to said unit is precooled by said waste water.

14. Refrigerating apparatus for cooling water including a refrigerating system having a refrigerant condenser, a cooling unit operatively connected to said refrigerating system, a conduit arranged about and encircling said cooling unit for supplying water to said cooling unit, and a conduit for carrying away cooled waste water, said waste water conduit being arranged in heat exchange relation with said supply conduit and said refrigerant condenser.

15. Refrigerating apparatus for cooling water including a refrigerating system having a refrigerant condenser, a cooling unit operatively connected to said refrigerating system, a conduit supplying water to said cooling unit, a conduit for carrying away cooled waste water arranged in heat exchange relation with said supply conduit, the lower portion of said waste water conduit being in heat exchange relation with the refrigerant condenser, said cooling unit being mounted within and substantially surrounded by said conduits.

In witness whereof I have hereunto set my hand.

CHRISTIAN STEENSTRUP.